(12) United States Patent  
Bixler et al.

(10) Patent No.: US 7,915,545 B1
(45) Date of Patent: Mar. 29, 2011

(54) SPLIT PROTECTIVE BUSHING

(76) Inventors: Jason M. Bixler, Toms River, NJ (US); Daniel B. Bixler, Toms River, NJ (US)

( * ) Notice: Subject to any disclaimer, the term of this patent is extended or adjusted under 35 U.S.C. 154(b) by 474 days.

(21) Appl. No.: 12/228,922

(22) Filed: Aug. 18, 2008

(51) Int. Cl.
*H02G 3/02* (2006.01)

(52) U.S. Cl. ........... 174/664; 174/653; 439/100; 439/83

(58) Field of Classification Search .................. 174/653, 174/664; 439/92, 100, 83, 93, 777, 833, 439/98, 799; 246/74.1, 74.2
See application file for complete search history.

(56) References Cited

U.S. PATENT DOCUMENTS

| | | | | |
|---|---|---|---|---|
| 3,117,388 A | * | 1/1964 | Clarke | 43/24 |
| 4,176,756 A | * | 12/1979 | Gellman | 215/274 |
| 4,233,469 A | * | 11/1980 | Steppe | 174/83 |
| 4,443,031 A | * | 4/1984 | Borsh et al. | 285/419 |
| 4,744,788 A | * | 5/1988 | Mercer, Jr. | 604/500 |
| 4,795,197 A | * | 1/1989 | Kaminski et al. | 285/12 |
| 5,406,032 A | * | 4/1995 | Clayton et al. | 174/151 |
| 5,873,144 A | * | 2/1999 | Tupper et al. | 16/18 CG |
| 5,911,585 A | * | 6/1999 | Zwit | 439/100 |
| 6,840,782 B1 | | 1/2005 | Borden et al. | |
| 7,182,611 B2 | | 2/2007 | Borden et al. | |

* cited by examiner

*Primary Examiner* — Dhiru R Patel
(74) *Attorney, Agent, or Firm* — Michael R. Philips

(57) ABSTRACT

A split protective bushing is provided herein in two embodiments. According to the first embodiment, a first half ring is formed with dovetail protrusions on each end and a second half ring is formed with mating dovetail sockets on each end. Interlocking the dovetail protrusions and the dovetail sockets forms a circular bushing. According to the second embodiment, a first segment and a second segment are pivotally connected at one end of each. A second end of each segment has a tongue and latch respectively for being locked together to form a complete ring. Both embodiments include an internal thread and a lip for engaging a connector in an electric installation.

2 Claims, 4 Drawing Sheets

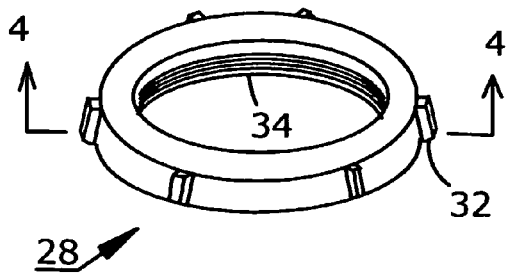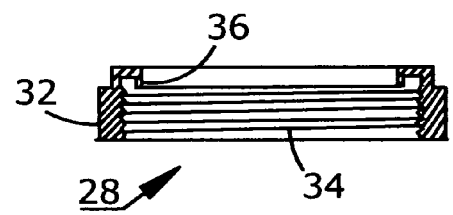
Fig. 3
PRIOR ART
Fig. 4
PRIOR ART
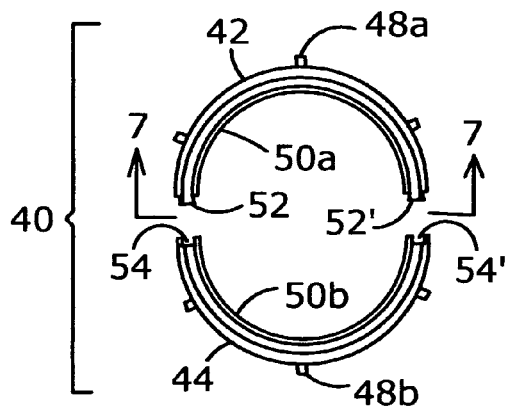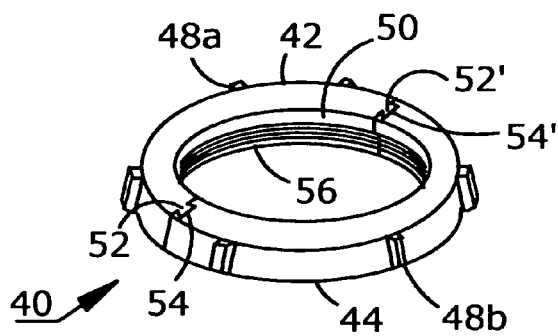
Fig. 5
Fig. 6
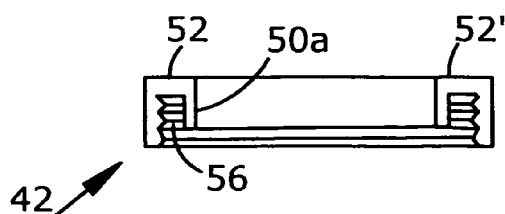
Fig. 7

US 7,915,545 B1

SPLIT PROTECTIVE BUSHING

FIELD OF THE INVENTION

The present invention relates to the field of electric insulation products, and more particularly to an insulating bushing for installation on a connector used to connect a conduit to a service box to prevent the wires passing through the connector from becoming damaged by the edge of the connector.

BACKGROUND OF THE INVENTION

Standard practice in the installation of electrical wiring is to attach a connector to a service box and attach a conduit to the connector. The wires being installed are then passed through the conduit, through the connector and into the service box. The purpose of the conduit is to enclose and protect the insulation on the wires from becoming damaged. However, it has been determined that in some circumstances, the insulation on the wires becomes damaged by contact with a relatively sharp edge at the exposed corner of the connector. This is especially true when the wires passing through the connector are then bent for attachment to devices in the service box, e.g. circuit breakers. Either due to vibration or simply the pressure of the bent wire pressing against the inner edge of the connector, the insulation may be abraded, resulting in a short circuit. To overcome this, dangerous and expensive problem, the National Electrical Code requires the use of a protective bushing at the open end of the connector to prevent the wire's insulating jacket from contacting the connector. This insulating bushing is generally a plastic ring with internal threads for engagement with external threads on the connector. The bushing must be assembled to the connector before the wires are pulled through.

While the National Electrical Code regulation theoretically corrects the problem outlined above, like many such well-intentioned requirements, this one is not always complied with. For various reasons, the required bushing is not always installed. Omission of the bushing is likely to be discovered by an electrical inspector who will require the installer to correct the omission before certifying the electrical work. Correction at this stage involves disconnecting the wires from the apparatus in the service box, passing the protective bushing over the wires and onto the connector threads and reconnecting the wires. This involves a substantial amount of added work. In order to avoid the extra work this late installation entails, some contractors have resorted to cutting the ring bushing to create an opening, and wrapping the split bushing around the wires to assemble to the connector. This practice is dangerous and against the Code regulations. Thus a need exists to allow a protective bushing to be installed without disconnecting already attached wires.

SUMMARY OF THE INVENTION

The split protective bushing of the present invention provides a novel solution to the problem described above. The invention bushing is formed in two mating segments that can be assembled and installed onto a connector after wires are in place. A first embodiment of the split bushing is configured with a pair of connective protrusions on a first segment and a pair of connective indentations on a second segment. A second embodiment of the split bushing is configured as a pivotably openable ring with an interlocking snap for closure. Both embodiments of the split bushing are formed with internal threads for assembly to the external threads on the connector. An inside lip of the split bushing is sized to overlap the inside diameter of the connector.

BRIEF DESCRIPTION OF THE DRAWINGS

The present invention is best understood in conjunction with the accompanying drawing figures in which like elements are identified by similar reference numerals and wherein:

FIG. 3 is a top perspective view of a protective ring bushing of the prior art.

FIG. 4 is a cross sectional view of the prior art protective ring bushing taken in the direction of line 4-4 of FIG. 3.

FIG. 5 is a bottom plan view of a split protective bushing according to a first embodiment of the present invention with the segments separated.

FIG. 6 is a top perspective view of the split protective bushing of FIG. 5 after the two segments are assembled to one another.

FIG. 7 is an end elevation view of one segment of the split protective bushing of FIG. 5 taken in the direction of line 7-7 of FIG. 5 and inverted to the normal top-up orientation.

DETAILED DESCRIPTION OF THE PREFERRED EMBODIMENT

Figure 1:
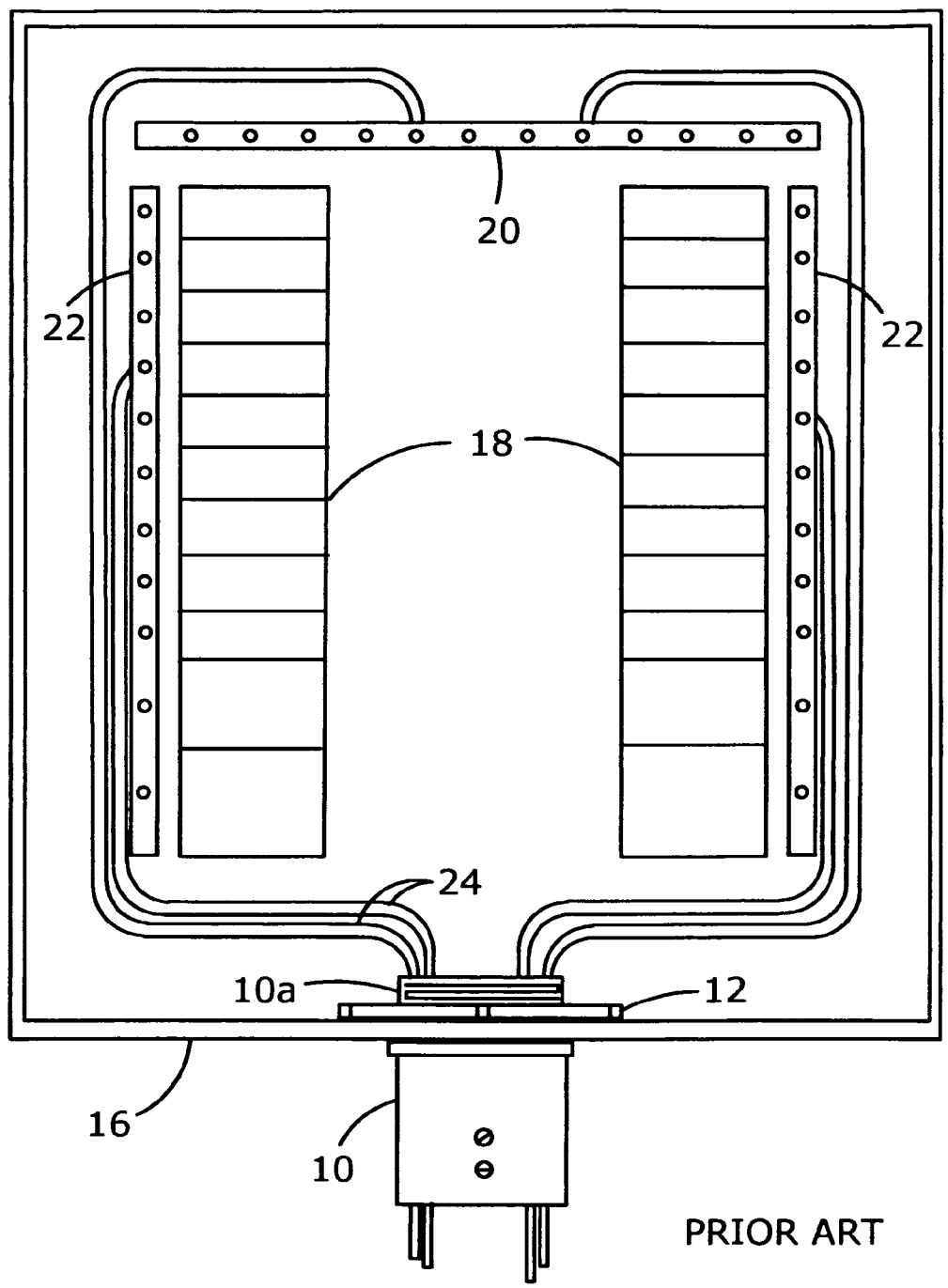
FIG. 1 is a front elevation view of a connector attached to an electrical service box with a set of wires installed without a protective bushing.

Referring now to the prior art shown in FIG. 1, a standard electrical connector 10 is attached to an electrical service box 16 by passing the threaded neck 10a of connector 10 through a hole in box 16 and securing with a nut 12. Electrical service box 16 may be fitted with, e.g. a series of circuit breakers 18, a neutral connective strip 20 and at least one power connective strip 22. A number of wires 24 are passed through connector 10 into box 16 and attached to respective neutral strip 20 and power strip 22. For clarity of illustration, a conduit to enclose the lower portion of wires 24 has been omitted. As described briefly above, the insulating jacket of at least some of wires 24 have direct contact with the inside upper corner of connector 10. The inside upper corner of connector 10 is frequently sharp enough to damage wire insulation. Due to either vibration, climatic heating and cooling or improper installation, the insulating jacket on certain of wires 24 may become abraded and the insulating value diminished or entirely eliminated, resulting in a short circuit. To repair the problem, the damaged wires must be removed and new wires installed, a time-consuming and costly process.

Figure 2:
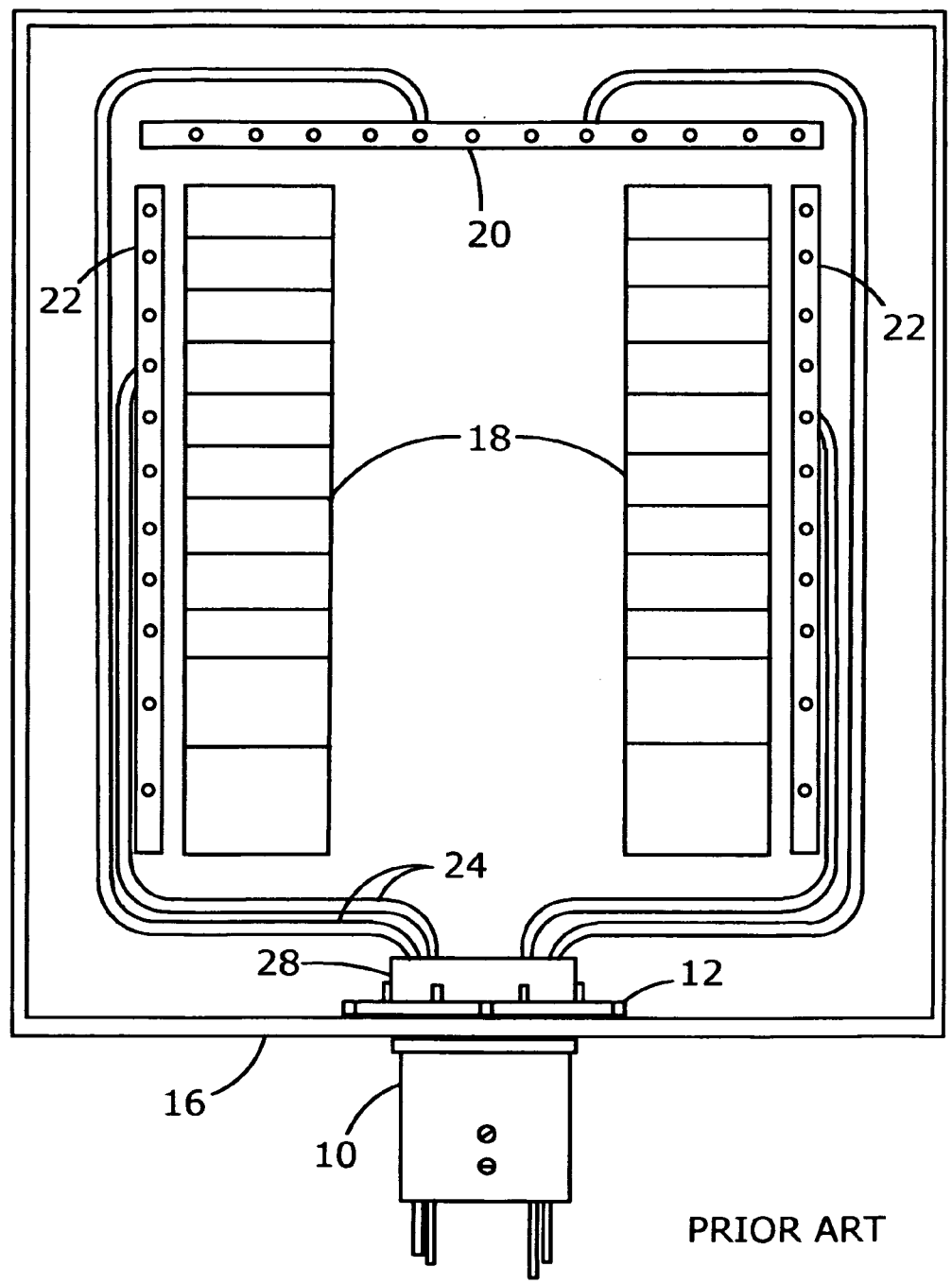
FIG. 2 is a front elevation view of the connector and box of FIG. 1 with a protective ring bushing of the prior art installed.

Referring now to FIG. 2, connector 10, electrical service box 16 and wires 24 of FIG. 1 are depicted with a protective ring bushing 28 of the prior art assembled onto the threaded end 10a (see FIG. 1) of connector 10. Whereas ring bushing 28 is formed as a continuous circle, ring bushing 28 must be installed as shown before wires 24 are pulled into electrical service box 16 and attached to neutral strip 20 and power strip 22. If this critical step of pre-installation of ring bushing 28 was not timely done, wires 16 will have to be disconnected and straightened, ring bushing 28 installed, and wires 16 re-bent and re-connected, involving considerable time. If this correction is not done, at the least an electrical inspection certificate should be withheld or possibly a fire may occur at a later date.

Referring now to FIGS. 3 and 4, ring bushing 28 of the prior art is shown in top perspective view and in cross sectional view, respectively. As illustrated, ring bushing 28 is formed with a series of external lugs 32 and an internal thread 34. Lugs 32 are provided to assist in tightening ring bushing 28 onto the top of connector 10 (see FIG. 1). A small downwardly directed lip 36 is formed at the upper end of ring bushing 28 with an inside diameter substantially equal to the inside diameter of connector 10 (see FIG. 1).

Referring now to FIG. 5, a split protective bushing 40 according to a first embodiment of the present invention is shown in bottom plan view. Split bushing 40 comprises a pair of interlocking half rings 42 and 44. Half rings 42 and 44 are formed substantially as semicircles. Half ring 42 is formed with a first dovetail protrusion 52 extending from a first end and a second dovetail protrusion 52' extending from a second end thereof. According to the preferred embodiment of the invention, dovetail protrusions 52, 52' are substantially identical to one another. A lip 50a is formed on the inner edge of half ring 42. A plurality of lugs 48a are formed on the outer periphery of half ring 42. Half ring 44 is formed with a first dovetail socket 54 in a first end and a second dovetail socket 54' in a second end thereof. According to the first embodiment of the invention, dovetail sockets 54, 54' are substantially identical to one another and are configured to snugly receive dovetail protrusions 52, 52'. Whereas the preferred embodiment shown and described includes interlocking dovetail shapes, alternate shapes of interlocking protrusions and sockets, e.g. a "T" shape or a "lollipop" shape, are considered to be within the scope of the invention. A lip 50b is formed in the inner edge of half ring 44, similar to lip 50a of half ring 42. A plurality of lugs 48b are formed on the outer periphery of half ring 44.

Referring now to FIG. 6, half ring 42 and half ring 44 have been assembled by interlocking dovetail protrusion 52 into dovetail socket 54 and dovetail protrusion 52' into dovetail socket 54' to form circular split protective bushing 40. A gripping surface 56 is seen on the inner diameter of split bushing 40, gripping surface 56 being either an array of convex formations, a plurality of parallel rings extending toward the center of split bushing 40, or an internal thread. An internal thread 56 to match the external thread 10a (see FIG. 1) on the upper portion of connector 10 is preferred. As will be readily understood, with two dovetail protrusions 52, 52' on half ring 42 and two dovetail sockets 54, 54' on half ring 44, split bushing 40 can only be assembled in one way, ensuring that threads 56 are properly aligned for mounting split bushing 40 to external thread 10a of connector 10. Lugs 48a, 48b protrude outward from the periphery of split bushing 40 to aid in tightening the threaded engagement.

Referring now to FIG. 7, an end elevation view is illustrated of half ring 42 taken in the direction indicated by line 7-7 of FIG. 5. Dovetail protrusions 52, 52' are seen over a gap formed between internal threads 56 and lip 50a. The gap thus formed is configured to overlie the upper edge of connector 10 (see FIG. 1), preventing wires passed through connector 10 from contacting the upper edge of connector 10. Lip 50a is formed with a diameter and length to overlap the upper end of connector 10 and protect the wires passed therethrough.

Figure 8:
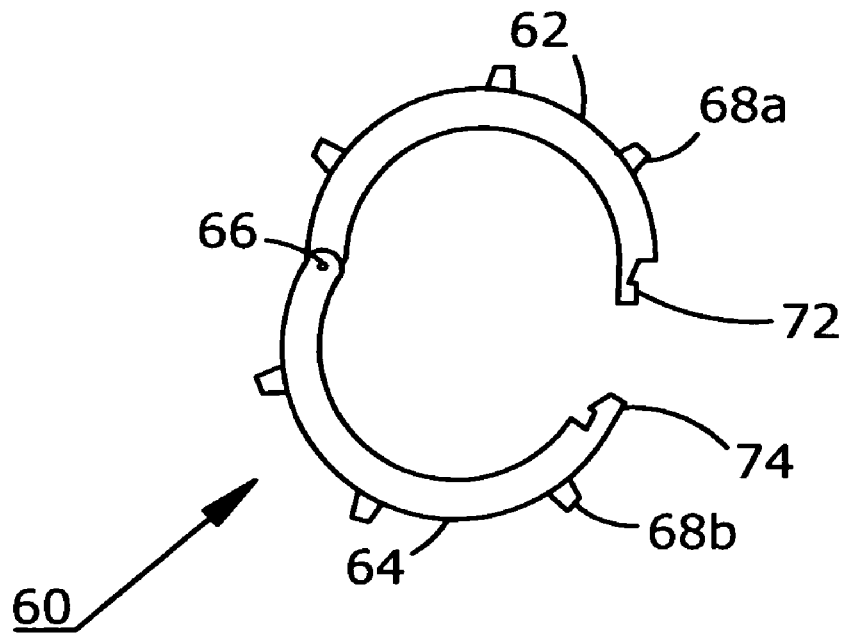
FIG. 8 is a top plan view of a pivotable split protective bushing according to a second embodiment of the present invention.

Referring now to FIG. 8, a second embodiment of the present invention is shown in top plan view as split protective pivot bushing 60. Pivot bushing 60 has a first substantially semicircular segment 62 that is pivotally connected to a second substantially semicircular segment 64 by means of a pin 66 or other pivotable means. A tongue 72 is formed at the end of first segment 62 and a latch 74 is formed at the end of second segment 64. Tongue 72 and latch 74 are configured to securely interlock when pivot bushing 60 is closed. Whereas tongue 72 and latch 74 are shown as lateral mirror image shapes, alternate interlocking shapes are considered to be within the scope of the present invention.

Figure 9:
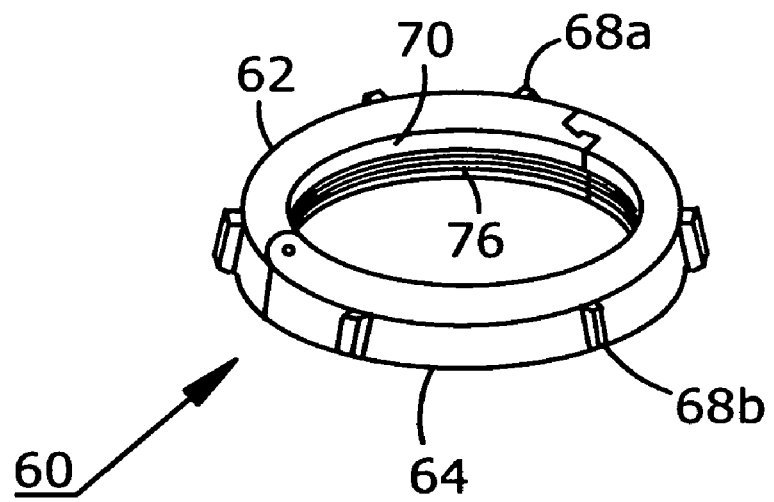
FIG. 9 is a top perspective view of the pivotable split protective bushing of FIG. 8 after being snapped closed.

Referring now to FIG. 9, pivot bushing 60 is shown in top perspective view with first segment 62 and second segment 64 being snapped closed. In closed condition, pivot bushing 60 forms a complete circle sized to thread onto the threaded upper end of connector 10 (see FIG. 1). Pivot bushing 60 is formed with an internal thread 76 configured to engage the thread of connector 10. A lip 70 is formed at the inner edge of pivot bushing 60 to overlap the upper edge and enter the top of connector 10. Lugs 68a, 68b are provided to assist in installing pivot bushing 60.

While the description above discloses preferred embodiments of the present invention, it is contemplated that numerous variations and modifications of the invention are possible and are considered to be within the scope of the claims that follow.

What is claimed is:

1. A split protective pivot bushing for mounting to a connector in an electric wiring system, the pivot bushing comprising:
   a. a first substantially semicircular segment;
   b. a second substantially semicircular segment;
   c. pivot means connecting a first end of each of the first and the second substantially semicircular segments;
   d. means formed on a second end of each of the first and the second segments for secure engagement when the first and the second segments are pivoted closed;
   e. internal threads formed in the first and second segments; and
   f. a lip formed within the bushing to overlap an upper edge of the connector;
   g. wherein when the first and second segments are pivoted closed and engaged, the split pivot bushing is configured for mounting to an external thread on the connector.

2. The pivot bushing described in claim 1, wherein the means for secure engagement comprises a tongue formed on the first segment and a latch formed on the second segment, the tongue and latch configured to securely engage one another.

* * * * *